(12) United States Patent
Farrugia et al.

(10) Patent No.: US 12,258,455 B2
(45) Date of Patent: Mar. 25, 2025

(54) VISCOUS BIO-DERIVED SOLVENTS FOR STRUCTURED ORGANIC FILM (SOF) COMPOSITIONS

(71) Applicant: XEROX CORPORATION, Norwalk, CT (US)

(72) Inventors: Valerie M. Farrugia, Oakville (CA); Robert Claridge, Gilford (CA)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 18/153,836

(22) Filed: Jan. 12, 2023

(65) Prior Publication Data
US 2024/0239967 A1 Jul. 18, 2024

(51) Int. Cl.
*C08J 3/09* (2006.01)
*B29C 71/02* (2006.01)
*C08J 5/18* (2006.01)

(52) U.S. Cl.
CPC ............ *C08J 3/095* (2013.01); *C08J 5/18* (2013.01); *C08J 7/08* (2013.01); *C08J 2461/16* (2013.01)

(58) Field of Classification Search
CPC ....... C08J 3/095; C08J 5/18; C08J 7/08; C08J 2461/16
See application file for complete search history.

(56) References Cited

U.S. PATENT DOCUMENTS 8,093,347 B2 * 1/2012 Heuft .................. C09B 23/12
528/211

FOREIGN PATENT DOCUMENTS

WO 2018/087542 A1 5/2018
WO 2019/008382 A1 1/2019

OTHER PUBLICATIONS

Zhenova, "Green Solvents for Polymer Applications," Thesis, Jun. 2019, 184 pages.
Tamers, "Distinguishing Between Bio-Ethanol' and Petroleum Ethanol," Jun. 1, 2006, 3 pages.

* cited by examiner

*Primary Examiner* — Rabon A Sergent
(74) *Attorney, Agent, or Firm* — MH2 Technology Law Group LLP

(57) ABSTRACT

A method of forming a pre-cure solution for a structured organic film (SOF) is described, including contacting at least one type of segment and at least one type of pre-linker with a bio-based solvent. The method also includes dissolving the at least one type of segment and the at least one type of pre-linker within the bio-based solvent. The method also includes where the bio-based solvent has a viscosity above 0.92 MPa-s. A composition including a bio-based solvent is also disclosed.

20 Claims, 1 Drawing Sheet

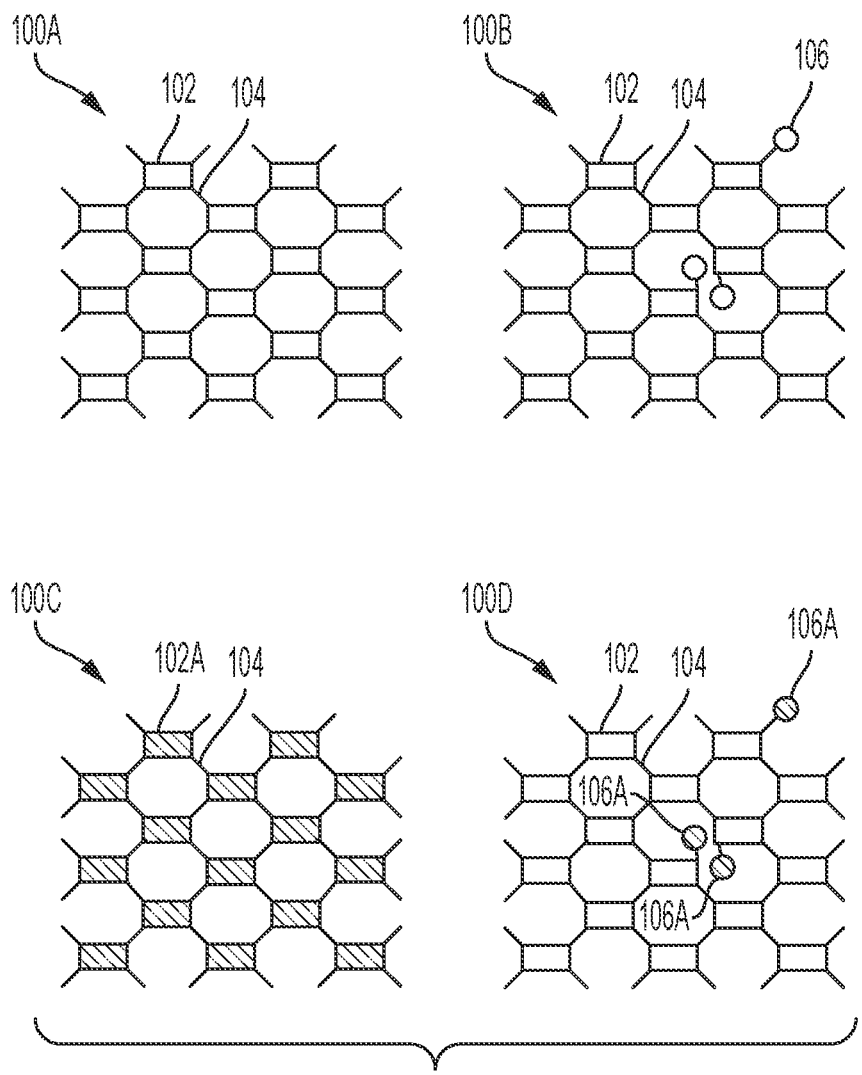

VISCOUS BIO-DERIVED SOLVENTS FOR STRUCTURED ORGANIC FILM (SOF) COMPOSITIONS

TECHNICAL FIELD

The present teachings relate generally to viscous bio-derived solvents and, more particularly, to bio-derived solvents for use in structured organic film compositions.

BACKGROUND

Viable "green" replacement solvents for conventional toxic "non-green" polar aprotic solvents are of interest in uses including structured organic film (SOF) membrane formulations, among other materials. The majority of solvents currently used in SOF formulations are derived from petrochemical building blocks which also require additional downstream processing in some cases. Many of these conventional organic solvents are also volatile, highly flammable, carcinogenic, cause negative effects on the environment, and general health and safety. Currently known available and safe polar aprotic solvents are limited and those that are available, such as dichloromethane (DCM), N-methyl-2-pyrrolidone (NMP), N,N'-dimethylformamide (DMF) or N,N'-dimethylacetamide (DMAc) have toxic effects for humans, wildlife, and the environment.

Furthermore, solvent systems with higher viscosity ranges to provide SOF molecular building block pre-cure solutions having lower solids content that can be coated into uniform wet films that dry to usable thicknesses, including, but not limited to between 20 nm to 150 microns depending on process variables are also of interest. Since SOF building blocks are based on small molecules that cure into linked networks upon heat or light energy, there is no chain entanglement as there are in diluted polymer solutions, causing a higher likelihood of pinhole-like surfaces and other defects during film formation. This is challenging for various coating processes, particularly when fabricating large-area uniform SOF films.

Therefore, it is desirable to provide green chemistry alternatives for solvents to be used in the formulation of structured organic films (SOFs) for the coating of functional membranes such as anion (AEM) and cation (CEM) exchange membranes for electrochemical and fuel cell applications as well as gas separation, storage, pollutant removal, and the like.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method of forming a pre-cure solution for a structured organic film (SOF) is disclosed. The method also includes contacting at least one type of segment and at least one type of pre-linker with a bio-based solvent. The method also includes dissolving the at least one type of segment and the at least one type of pre-linker within the bio-based solvent. The method also includes where the bio-based solvent has a viscosity above 0.92 MPa-s.

Implementations of the method of forming a structured organic film (SOF) may include heating the at least one type of segment and the at least one type of pre-linker and the bio-based solvent, where heating the at least one type of segment and the at least one type of pre-linker and the bio-based solvent is performed before or after dissolving the at least one type of segment and the at least one type of pre-linker within the bio-based solvent. The method of forming a pre-cure solution for a structured organic film (SOF) may include contacting a plurality of capping segments with the at least one type of segment and the at least one type of pre-linker and the bio-based solvent while forming the pre-cure solution. At least one type of segment and/or at least one or more of the plurality of capping segments may include at least one ionic species. The method of forming a pre-cure solution for a structured organic film (SOF) may include contacting one or more additives with the pre-cure solution. The method of forming a pre-cure solution for a structured organic film (SOF) may include contacting one or more catalysts with the pre-cure solution. Catalyst is added in an amount from about 0.1 wt % to about 3 wt % based on a total weight of the pre-cure solution. A portion of at least one type of segment may include an ionic capping segment. The method of forming a pre-cure solution for a structured organic film (SOF) may include allowing the bio-based solvent to evaporate to form the structured organic film (SOF) prior to heating the pre-cure solution. The pre-cure solution is heated from about 60° C. to about 90° C. The structured organic film (SOF) is cured from about 100° C. to about 200° C. for about 1 hour. No catalyst is added to the pre-cure solution or the structured organic film (SOF). The bio-based solvent may include dihydrolevoglucosenone, 1-butylpyrrolidin-2-one, ethyl lactate, methyl-5-(dimethylamino)-2-methyl-5-oxopentanoate, dimethyl isosorbide, γ-valerolactone, glycofurol, triacetin, diethylene glycol monoethyl ether acetate, acetyltributylcitrate, acetyltriethylcitrate, triethyl citrate, or combinations thereof. The bio-based solvent may include dihydrolevoglucosenone.

Another method of forming a pre-cure solution for a structured organic film (SOF) is disclosed. The method includes contacting at least one type of segment and at least one type of pre-linker with a bio-based solvent, heating the at least one type of segment and the at least one type of pre-linker with the bio-based solvent. The method also includes dissolving the at least one type of segment and the at least one type of pre-linker within the bio-based solvent. The method also includes forming a structured organic film (SOF) on a substrate from the pre-cure solution. The method also includes curing the structured organic film (SOF), where: the bio-based solvent has a viscosity above 0.92 MPa-s, and heating the at least one type of segment and the at least one type of pre-linker and the bio-based solvent is performed before or after dissolving the at least one type of segment and the at least one type of pre-linker within the bio-based solvent.

Implementations of the method of forming a structured organic film (SOF) include where the bio-based solvent may include dihydrolevoglucosenone, 1-butylpyrrolidin-2-one, ethyl lactate, methyl-5-(dimethylamino)-2-methyl-5-oxo-pentanoate, dimethyl isosorbide, γ-valerolactone, glycofurol, triacetin, diethylene glycol monoethyl ether acetate, acetyltributylcitrate, acetyltriethylcitrate, triethyl citrate, or combinations thereof. The structured organic film (SOF) may include a membrane. The structured organic film (SOF) can be free-standing and thus not adhered to the substrate or a supporting structure after curing. The substrate may include polyetheretherketone (PEEK).

A composition is disclosed, the composition including a bio-based solvent. The composition also includes at least one type of SOF segments. The composition also includes at least one type of SOF pre-linkers. The composition also includes where a viscosity of the composition is from about 5 to about 150 MPa-s.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the FIGURES:

FIG. 1 illustrates the differences between a standard structured organic film, a structured organic film having a capping segment, a structured organic film having molecular building blocks with ionic functionality, and a structured organic film having a capping segment with ionic functionality, in accordance with the present disclosure.

It should be noted that some details of the FIGURES have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

"Structured organic film" (SOF) refers to a COF that is a film at a macroscopic level. The SOFs of the present disclosure have a capping segment or group added into the SOF formulation, which (after film formation), ultimately bonds to the SOF via at least one functional group located on the capping segment. SOFs of the present disclosure in certain examples can have non-ionic or ionic character, including cationic or anionic. This ionic character can be imparted by either a charged molecular building block or a capping group in the SOF structure.

In this specification and the claims that follow, singular forms such as "a," "an," and "the" include plural forms unless the content clearly dictates otherwise.

The term "SOF" generally refers to a covalent organic framework (COF) that is a film at a macroscopic level. The phrase "macroscopic level" refers, for example, to the naked eye view of the present SOFs. Although COFs are a network at the "microscopic level" or "molecular level" (requiring use of powerful magnifying equipment or as assessed using scattering methods), the present SOF is fundamentally different at the "macroscopic level" because the film is for instance orders of magnitude larger in coverage than a microscopic level COF network. SOFs described herein have macroscopic morphologies much different than typical COFs previously synthesized. Films as presently disclosed in a free-standing film example, or as coated onto a surface, include but are not limited to, a top surface and a bottom surface, in which "top" and "bottom" can be dependent on a temporal orientation or position of the film. Furthermore, a surface is still considered a surface even if adhered or bound to a substrate or other material. Films as presently disclosed in a free-standing film example, or as coated onto a surface, also include one or more edges, which can be, but are not limited to, one or more boundaries between where a film is present and where a film is not present. Free-standing films are further not adhered to a substrate or a supporting structure after curing and may be removed from a coating mandrel or coating support to be used in another configuration or form as compared to an as-coated state.

Additionally, when a capping segment is introduced into the SOF, the SOF framework is locally 'interrupted' where the capping segments are present. These SOF compositions are 'covalently doped' because a foreign molecule is bonded to the SOF framework when capping segments are present. Capped SOF compositions may alter the properties of SOFs without changing constituent building block segments. For example, the mechanical and physical properties of the capped SOF where the SOF framework is interrupted may differ from that of an uncapped SOF or an SOF without capping segments.

The SOFs of the present disclosure are at the macroscopic level substantially pinhole-free SOFs or pinhole-free SOFs having continuous covalent organic frameworks that can extend over larger length scales such as for instance much greater than a millimeter to lengths such as a meter and, in theory, as much as hundreds of meters. It will also be appreciated that SOFs tend to have large aspect ratios where typically two dimensions of a SOF will be much larger than the third. SOFs have markedly fewer macroscopic edges and disconnected external surfaces than a collection of COF particles.

In examples, a "substantially pinhole-free SOF" or "pinhole-free SOF" may be formed from a reaction mixture deposited on the surface of an underlying substrate. The term "substantially pinhole-free SOF" refers, for example, to an SOF that may or may not be removed from the underlying substrate on which it was formed and contains substantially no irregular pinholes, blisters, ruptures, or gaps, such as those that would be considered coating defects that could form such as when a bubble ruptures during a film formation that is greater than the distance between the cores of two adjacent segments per square cm; such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free SOF" refers, for example, to an SOF that may or may not be removed from the underlying substrate on which it was formed and contains no unintended pinholes or gaps greater than the distance between the cores of two adjacent segments per $micron^2$, such as no pinholes or gaps greater than about 500 Angstroms in diameter per $micron^2$. Pores that are intentionally and uniformly introduced into SOFs as tunable features for transport via a membrane are distinguished from pinholes for the purposes of this disclosure.

A need for ion exchange membranes, or more specifically anionic functional exchange membranes synthesized from highly ordered patterned network systems including imidazolium compounds that can be used in a variety of applications such as fuel cells, redox flow batteries, electrolyzers, reverse electrodialysis cells, and microbial fuel cells can be addressed by using covalent organic frameworks (COFs). Covalent organic frameworks (COFs) are highly patterned materials with molecular components called building blocks or building block segments which differ from monomers used to synthesis polymers. COFs react to form two- or three-dimensional networks made up of these building block segments that are linked to each other through strong covalent bonds. COFs are typically in powder form and are highly porous materials with extremely low densities. Examples of the present disclosure take advantage of COF's molecular building block approach to design structured organic films (SOFs) that also rely on the same segments, capping segments including imidazolium compounds and linkers as used to arrange COFs but at a macroscopic level are assembled as a film.

Examples of the present disclosure provides bio-based or "green" polar aprotic candidates that can be used as solvents for formulating or preparing SOF pre-cure solutions. These candidate solvents as described herein exhibit a considerable improvement in reducing human health issues as well as environmental hazards. Illustrative examples include, but are not limited to SOF formulations including Cyrene™, Rhodiasolv® PolarClean, dimethyl isosorbide (DMI), γ-valerolactone (GVL), cyclopentyl methyl ether, ethyl lactate and glycofurol.

Currently used solvents for SOF formulations include dimethylformamide (DMF) in formulations used for fabrication of anionic exchange membranes (AEM). DMF is a highly regulated solvent and considered a hazardous chemical when used in textile and apparel manufacturing. DMF is easily absorbed by the dermal and respiratory systems and is a known liver toxicant and probable human carcinogen. Other health issues include skin or eye irritation, reproductive or developmental toxicity, endocrine activity disruption, and neurotoxicity. Cyrene™, for example, has been identified as one drop-in replacement solvent for DMF since it has similar solubilizing properties to this dipolar aprotic solvent without the negative environmental or toxicological attributes.

In embodiments, the SOF comprises at least one atom of an element that is not carbon, such at least one atom selected from the group consisting of hydrogen, oxygen, nitrogen, silicon, phosphorous, selenium, fluorine, boron, and sulfur. In further embodiments, the SOF is a boroxine-, borazine-, borosilicate-, and boronate ester-free SOF.

Molecular Building Block

The SOFs of the present disclosure comprise molecular building blocks also referred to as building block segments having a segment (S) and functional groups (Fg). Molecular building blocks require at least two functional groups (x≥2) and may comprise a single type or two or more types of functional groups. Functional groups are the reactive chemical moieties of molecular building blocks that participate in a chemical reaction to link together segments during the SOF forming process. A segment is the portion of the molecular building block that supports functional groups and comprises an atoms that are not associated with functional groups. Further, the composition of a molecular building block segment remains unchanged after SOF formation.

Functional Group

Functional groups are the reactive chemical moieties of molecular building blocks that may participate in a chemical reaction to link together segments during the SOF forming process. Functional groups may be composed of a single atom, or functional groups may be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, imines, ureas, aldehydes, isocyanates, tosylates, alkenes, alkynes and the like. Other examples can include, but are not limited to haloformyls, oxygen containing groups (e.g. hydroxyls, anhydrides, carbonyls, carboxyls, carbonates, carboxylates, aldehydes, esters, hydroperoxy, peroxy, ethers, and orthoesters), nitrogen-containing groups (e.g. carboxamides, amines, imines, imides, azides, azos, cyanates, isocyanates, nitrates, nitriles, isonitriles, nitrosos, nitros, nitrosooxy), sulfur-containing groups (sulfhydryls, sulfides, disulfides, sulfinyls, sulfos, thiocyanates, isothiocyanates, and carbonothioyls), phosphorous-containing groups (e.g. phosphinos, phosphonos, and phosphates), silicon-containing groups (Si(OH)3, Si(SH)4, silanes, silyls, and siloxanes), boron containing groups (e.g. boronic acid, boronic esters, and boronic ethers), metal or metalloid-containing groups (e.g. Ge(OH)$_3$, Ge(SH)$_4$, AsO$_3$H, AsO$_4$H, As(SH)$_3$, Sn(OH)$_3$, Sn(CH$_3$)$_3$, and Sn(Bu)$_3$), or combinations thereof.

Molecular building blocks contain a plurality of chemical moieties, but only a subset of these chemical moieties are intended to be functional groups during the SOF forming process. Whether or not a chemical moiety is considered a functional group depends on the reaction conditions selected for the SOF forming process. Functional groups (Fg) denote a chemical moiety that is a reactive moiety, that is, a functional group during the SOF forming process.

In the SOF forming process the composition of a functional group will be altered through the loss of atoms, the gain of atoms, or both the loss and the gain of atoms; or, the functional group may be lost altogether. In the SOF, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the SOF. Linker groups are described below.

Capping Segments Ionic Capping Segments and Ionic Building Blocks

Capping segments of the present disclosure are molecules that 'interrupt' the regular network of covalently bonded building blocks normally present in an SOF and may further incorporate an ionic charging functionality into the SOF network. An SOF including one or more capping segments may also be referred to as capped SOFs. The differences between a SOF and SOFs having capping segments, capping segments having ionic functionality, or molecular building blocks having ionic functionality are illustrated in FIG. 1. FIG. 1 illustrates the differences between a standard structured organic film, a structured organic film having a capping segment, a structured organic film having molecular building blocks with ionic functionality, and a structured organic film having a capping segment with ionic functionality. Various networks of SOFs are shown, wherein a typical SOF network 100A is shown in FIG. 1A, having several segments 102 connected by several linkers 104. Another SOF network 100B is representative of a capped SOF network 100B having several segments 102 connected by several linkers 104, wherein a capping segment 106 closes off or terminates a branch of the segment 102. In SOF network 100C, a plurality of segments having ionic functionality, also referred to as an ionic building block 102A are shown to be connected by linkers 104. In SOF network 100D, a plurality of segments 102 connected by several linkers 104 are illustrated, wherein a capping segment having an ionic group 106A closes off or terminates a branch of the segment 102. Capping segments can be absent an ionic group as in capping segment 106 or have an ionic group as in capping segment 106A, but have only one linking functional group (Fg) that reacts to terminate or close off a branch of a segment 102 of an SOF. The ionic group on a capping segment can have ionic character initially or via a chemical reaction or treatment in a post-processing step after formation of the SOF. Molecular building blocks can be absent an ionic group as in segment 102 or have an ionic group as in ionic building block 102A. Molecular building blocks 102, 102A also have more than one linking Fg that reacts with the SOF to form the SOF network. The ionic group on a molecular building block can have ionic character initially or via a chemical reaction or treatment in a post-processing step after formation of the SOF. While the exemplary SOF networks 100A, 100B, 100C, 100D illustrate the inclusion of various components to an SOF network of the present disclosure, they are non-limiting, and certain examples of SOF networks of the present disclosure can have some or all of the various segments, linkers, capping segments, ionic capping segments, molecular building blocks, ionic molecular building blocks, or combinations thereof.

Capped SOF compositions or SOF compositions having ionic groups in either the segments or molecular building blocks, or capping segments can provide tunable materials whose properties can be varied through the type and amount of ionic groups introduced. Conventional membranes used in IEC or charged membrane applications are typically made by providing a polymer or network backbone, followed by subsequent introduction of a charge functionality. Examples of the present disclosure provide structured organic networks where during synthesis, ionic or charged capping segments or alternatively ionic or charged molecular building blocks are incorporated into the structured organic network. As noted previously, in certain examples, charge can be either present upon network formation or induced after network formation by a chemical reaction or post-processing step such as, but not limited to those as described herein. For purposes of the present disclosure, a capping segment having an ionic group prior to processing or after processing or formation may be referred to as an ionic capping segment. Furthermore, a molecular building block having an ionic group prior to processing or after processing or formation may be referred to as an ionic molecular building block or ionic building block or ionic segment.

In embodiments, the capping segments have a structure that is unrelated to the structure of any of the molecular building blocks that are added into the SOF formulation, which (after film formation) ultimately becomes the SOF. In other words, a capping segment is the portion of a capping group or capping unit that supports functional groups and comprises atoms that are not associated with functional groups. Further, the composition of a capping segment remains unchanged after SOF formation.

A capping segment molecule has one functional group that has suitable or complementary functional groups (as described above) to participate in a chemical reaction to link to another segment during the SOF forming process. A second chemical moiety that is not suitable or complementary to participate in the specific chemical reaction to link together segments during the SOF forming process and thus cannot bridge any further adjacent molecular building blocks. However, after the SOF is formed such functional groups may be available for further reaction with additional components and thus allowing for the further refining and tuning of the various properties of the formed SOF. Ionic species such as anionic or cationic species such as ionic (including cationic or anionic) molecular building block segments and capping groups can be used in SOF films useful for cation exchange membranes, anion exchange membranes, and the like.

SOFs having capping segments or capping segment precursors may further include capping segments that directly provide an ionically charged functionality, or alternatively can be capping segments that can be induced to have ionic charge during or after film formation processes. While such reactions are possible with piperidinium, spirobipiperidinium, and spirobipyrrolidinium compounds, the charged N+ ion is inherent. In certain examples, various counter ions may be exchanged with the ionically charged functionality.

In embodiments, the SOF may comprise a mixture of capping segments, such as any combination of a first capping segment, a second capping segment, a third capping segment, a fourth capping segment, etc., where the structure of the capping segment varies. In embodiments, the structure of a capping segment or a combination of multiple capping segments may be selected to either enhance or attenuate the chemical and physical properties of SOF; or the identity of the chemical moieties or functional group(s) on that are not suitable or complementary to participate in the chemical reaction to link together segments during the SOF forming process may be varied to form a mixture of capping segments. Thus, the type of capping segment introduced into the SOF framework may be selected to introduce or tune a desired property of SOF.

In embodiments, a SOF contains segments, which are not located at the edges of the SOF, that are connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments. In embodiments, Type 2 and 3 SOFs contains at least two segment types, which are not located at the edges of the SOF, where at least one segment type is connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments. In embodiments, an SOF or a pre-cure solution thereof can include one or more pre-linker that is dissolved in solution, forming a linker in the SOF upon curing.

In embodiments, the SOF comprises a plurality of segments, where all segments have an identical structure, and a plurality of linkers, which may or may not have an identical structure, wherein the segments that are not at the edges of the SOF are connected by linkers to at least three other segments and/or capping groups. In embodiments, the SOF comprises a plurality of segments where the plurality of segments comprises at least a first and a second segment that are different in structure, and the first segment is connected by linkers to at least three other segments and/or capping groups when it is not at the edge of the SOP.

In embodiments, the SOF comprises a plurality of linkers including at least a first and a second linker that are different in structure, and the plurality of segments either comprises at least a first and a second segment that are different in structure, where the first segment, when not at the edge of the SOF, is connected to at least three other segments and/or capping groups, wherein at least one of the connections is via the first linker, and at least one of the connections is via the second linker; or comprises segments that all have an identical structure, and the segments that are not at the edges of the SOF are connected by linkers to at least three other segments and/or capping groups, wherein at least one of the connections is via the first linker, and at least one of the connections is via the second linker.

In embodiments, the capping segments have a structure that substantially corresponds to the structure of one of the molecular building blocks (such as the molecular building blocks for SOFs that are detailed in U.S. Pat. Nos. 8,093,347; 8,436,130; 8,357,432; 8,394,495; 8,389,060; 8,318,892; and 9,097,995, which have been incorporated by reference) that is added to the SOF formulation, but one or more of the functional groups present on the building block is either missing or has been replaced with a different chemical moiety or functional group that will not participate in a chemical reaction (with the functional group(s) of the building blocks that are initially present) to link together segments during the SOF forming process.

A capping segment having a structure unrelated to the molecular building block or segment in the SOF may be, for example, an alkyl moiety (for example, a branched or unbranched saturated hydrocarbon group, derived from an alkane and having the general formula CnH2n+1, in which n is a number of 1 or more) in which one of the hydrogen atoms has been replaced by an —OH group. In such a formulation, a reaction between the capping segment and the molecular building block or segment, for example, a reaction between the alcohol (—OH) groups, would link the capping segment and the molecular building blocks together through the formation of (linking) ether groups. Other functional group reactions as described herein are applicable as well.

In embodiments, the capping segment molecules are mono-functionalized. For example, in embodiments, the capping segments comprise only a single suitable or complementary functional group (as described above) that participates in a chemical reaction to link together segments during the SOF forming process and thus cannot bridge any further adjacent molecular building blocks (until a building block with a suitable or complementary functional group is added, such as when an additional SOF is formed on top of a capped SOF base layer and a multilayer SOF is formed).

When such capping segments are introduced into the SOF coating formulation, upon curing, interruptions in the SOF framework are introduced. Interruptions in the SOF framework are therefore sites where the single suitable or complementary functional group of the capping segments have reacted with the molecular building block and locally terminate (or cap) the extension of the SOF framework and interrupt the regular network of covalently bonded building blocks normally present in an SOF. The type of capping segments (or structure of the capping segment) introduced into the SOF framework may be used to tune the properties of the SOF.

In embodiments, the capping segment molecules may comprise more than one chemical moiety or functional group. For example, the SOF coating formulation, which (after film formation), ultimately becomes bonded in the SOF may comprise a capping segment having at least two or more chemical moieties or functional groups, such as 2, 3, 4, 5, 6 or more chemical moieties or functional groups, where only one of the functional groups is a suitable or complementary functional group (as described above) that participates in a chemical reaction to link together segments during the SOF forming process. The various other chemical moieties or functional groups present on the molecular building block are chemical moieties or functional groups that are not suitable or complementary to participate in the specific chemical reaction to link together segments initially present during the SOF forming process and thus cannot bridge any further adjacent molecular building blocks. However, after the SOF is formed such chemical moieties and/or functional groups may be available for further reaction (similar to dangling functional groups, as discussed below) with additional components and thus allow for the further refining and tuning of the various properties of the formed SOF, or chemically attaching various other SOF layers in the formation of multilayer SOFs.

In embodiments, the molecular building blocks may have x functional groups (where x is two or more), with at least one molecular building block type having at least three functional groups) and the capping segment molecules may comprise a capping segment molecule having 1 functional groups that are suitable or complementary functional group (as described above) and participate in a chemical reaction to link together segments during the SOF forming process. For example, x would be three for tris-(4-hydroxymethyl) triphenylamine (above), and x would be four for the building block illustrated below, N,N,N',N'-tetrakis-[(4-hydroxymethyl)phenyl]-biphenyl-4,4'-diamine (THM-TBD):

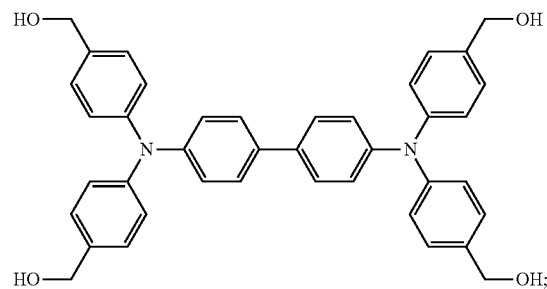 [SMILES: OCc1ccc(N(c2ccc(CO)cc2)c2ccc(-c3ccc(N(c4ccc(CO)cc4)c4ccc(CO)cc4)cc3)cc2)cc1]

tetra-(methyl 4-hydro-methylphenyl ether)biphenyl-4,4'-diamine (TME-TBD)

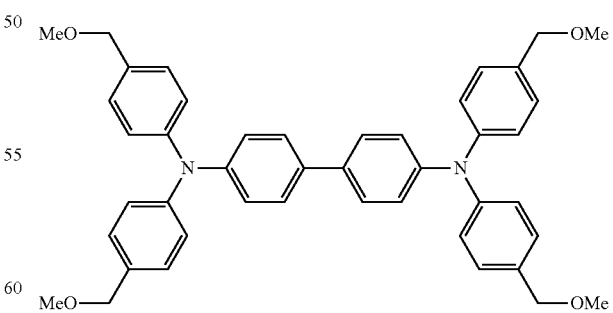

Segment

A segment is the portion of the molecular building block that supports functional groups and comprises all atoms that are not associated with functional groups. Further, the composition of a molecular building block segment remains unchanged after SOF formation. In embodiments, the SOF may contain a first segment having a structure the same as or different from a second segment. In other embodiments, the structures of the first and/or second segments may be the same as or different from a third segment, forth segment, fifth segment, etc. A segment is also the portion of the molecular building block that can provide an inclined property. Inclined properties are described later in the embodiments. It should be noted that different segment types, as described herein, can be or can include, but are not limited to, one or more building block segments, capping segments, ionic capping segments, ionic building block segments, or combinations thereof.

In specific embodiments, the segment of the SOF comprises at least one atom of an element that is not carbon, such at least one atom selected from the group consisting of hydrogen, oxygen, nitrogen, silicon, phosphorous, selenium, fluorine, boron, and sulfur.

A description of various exemplary molecular building blocks, linkers, SOF types, strategies to synthesize a specific SOF type with exemplary chemical structures, building blocks whose symmetrical elements are outlined, and classes of exemplary molecular entities and examples of members of each class that may serve as molecular building blocks or other components for SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

Pre-Linker

A pre-linker is a chemical moiety that forms a linker in the SOF upon chemical reaction between functional groups on a molecular building block, capping segment ionic capping segment, or ionic building block. Types of SOF pre-linkers can be or include polyols, such as glycol, diethyleneglycol, polyethylene glycol, glycerol, dipentaerithritol, tripentaerythritol, or 1,1,1-tris(hydroxymethyl)propane. Other illustrative SOF pre-linkers can be or include diamines or polyamines such as 1,2-diaminoethane, 1,3-diaminopropane, 1,8-diaminooctane, propane-1,2,3-triamine, pentane-1,3,5-triamine, benzene-1,3,5-triamine, pentane-1,2,4,5-tetraamine, or butane-1,1,4,4-tetraamine. Other illustrative SOF pre-linkers can be or include diacids or polycarboxylic acids such as oxalic acid, malonic acid, succinic acid, tricarballylic acid, tricarboxylic acid, 1,3,5-cylcohexane-tricarboxylic acid, 1,2,3,4,5,6-cyclohexanehexacarboxylic acid, or trimesic acid. Additional illustrative SOF pre-linkers can be or include acid chlorides such as adipoyl chloride, malonyl chloride, succinyl chloride, sebacoyl chloride, terephthalyl chloride, or 1,3,5-benzenetricarbonyl trichloride. Additional illustrative SOF pre-linkers can be or include diethyl oxalate, diethylmalonate, or ethylenediaminetetraacetic acid triethyl ester.

Linker

A linker is a chemical moiety that emerges in a SOF upon chemical reaction between functional groups present on the molecular building blocks and/or capping segments.

A linker may comprise a covalent bond, a single atom, or a group of covalently bonded atoms. The former is defined as a covalent bond linker and may be, for example, a single covalent bond or a double covalent bond and emerges when functional groups on all partnered building blocks are lost entirely. The latter linker type is defined as a chemical moiety linker and may comprise one or more atoms bonded together by single covalent bonds, double covalent bonds, or combinations of the two. Atoms contained in linking groups originate from atoms present in functional groups on molecular building blocks prior to the SOF forming process. Chemical moiety linkers may be well-known chemical groups such as, for example, esters, ketones, amides, imines. ethers, urethanes, carbonates, and the like, or derivatives thereof.

For example, when two hydroxyl (—OH) functional groups are used to connect segments in a SOF via an oxygen atom, the linker would be the oxygen atom, which may also be described as an ether linker. In embodiments, the SOF may contain a first linker having a structure the same as or different from a second linker. In other embodiments, the structures of the first and/or second linkers may be the same as or different from a third linker, etc.

A capping segment may be bonded in the SOF in any desired amount as long as the general SOF framework is sufficiently maintained. For example, in embodiments, a capping segment may be bonded to at least 0.1% of all linkers, but not more than about 40% of all linkers present in an SOF, such as from about 0.5% to about 30%, or from about 2% to about 20%. In embodiments, substantially all segments may be bound to at least one capping segment, where the term "substantially all" refers, for example, to more than about 95%, such as more than about 99% of the segments of the SOF. In the event capping segments bond to more than 50% of the available functional groups on the molecular building blocks (from which the linkers emerge), oligomers, linear polymers, and molecular building blocks that are fully capped with capping segments may predominately form instead of a SOF. In certain examples of SOFs, capping segments may be quantitatively expressed in terms of mol %, concentration, or as ratios compared to either a segment composition or of an entire SOF composition.

In specific embodiments, the linker comprises at least one atom of an element that is not carbon, such at least one atom selected from the group consisting of hydrogen, oxygen, nitrogen, silicon, phosphorous, selenium, fluorine, boron, and sulfur.

Metrical Parameters of SOFs

SOFs have any suitable aspect ratio. In embodiments, SOFs have aspect ratios for instance greater than about 30:1 or greater than about 50:1, or greater than about 70:1, or greater than about 100:1, such as about 1000:1. The aspect ratio of a SOF is defined as the ratio of its average width or diameter (that is, the dimension next largest to its thickness) to its average thickness (that is, its shortest dimension). The term 'aspect ratio,' as used here, is not bound by theory. The longest dimension of a SOF is its length and it is not considered in the calculation of SOF aspect ratio.

Generally, SOFs have widths and lengths, or diameters greater than about 500 micrometers, such as about 10 mm, or 30 mm. The SOFs have the following illustrative thicknesses: about 10 Angstroms to about 250 Angstroms, such as about 20 Angstroms to about 200 Angstroms, for a mono-segment thick layer and about 20 nm to about 5 mm, about 50 nm to about 10 mm for a multi-segment thick layer.

SOF dimensions may be measured using a variety of tools and methods. For a dimension about 1 micrometer or less, scanning electron microscopy is the preferred method. For a dimension about 1 micrometer or greater, a micrometer (or ruler) is the preferred method.

Multilayer SOFs

A SOF may comprise a single layer or a plurality of layers (that is, two, three or more layers). SOFs that are comprised of a plurality of layers may be physically joined (e.g., dipole and hydrogen bond) or chemically joined. Physically attached layers are characterized by weaker interlayer interactions or adhesion; therefore physically attached layers may be susceptible to delamination from each other. Chemically attached layers are expected to have chemical bonds (e.g., covalent or ionic bonds) or have numerous physical or intermolecular (supramolecular) entanglements that strongly link adjacent layers.

Therefore, delamination of chemically attached layers is much more difficult. Chemical attachments between layers may be detected using spectroscopic methods such as focusing infrared or Raman spectroscopy, or with other methods having spatial resolution that can detect chemical species precisely at interfaces. In cases where chemical attachments between layers are different chemical species than those within the layers themselves it is possible to detect these attachments with sensitive bulk analyses such as solid-state nuclear magnetic resonance spectroscopy or by using other bulk analytical methods.

In the embodiments, the SOF may be a single layer (mono-segment thick or multi-segment thick) or multiple layers (each layer being mono-segment thick or multi-segment thick). "Thickness" refers, for example, to the smallest dimension of the film. As discussed above, in a SOF, segments are molecular units that are covalently bonded through linkers to generate the molecular framework of the film. The thickness of the film may also be defined in terms of the number of segments that is counted along that axis of the film when viewing the cross-section of the film. A "monolayer" SOF is the simplest case and refers, for example, to where a film is one segment thick. A SOF where two or more segments exist along this axis is referred to as a "multi-segment" thick SOF.

An exemplary method for preparing physically attached multilayer SOFs includes: (1) forming a base SOF layer that may be cured by a first curing cycle, and (2) forming upon the base layer a second reactive wet layer followed by a second curing cycle and, if desired, repeating the second step to form a third layer, a fourth layer and so on. The physically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be physically stacked. Alternative examples of SOFs according to the present disclosure include free-standing films. The free-standing film thickness can be from about 1 μm to about 500 μm, or from about 10 μm to about 250 μm, or from about 100 μm to about 150 μm.

In embodiments, a multilayer SOF is formed by a method for preparing chemically attached multilayer SOFs by: (1) forming a base SOF layer having functional groups present on the surface (or dangling functional groups) from a first reactive wet layer, and (2) forming upon the base layer a second SOF layer from a second reactive wet layer that comprises molecular building blocks with functional groups capable of reacting with the dangling functional groups on the surface of the base SOF layer. In further embodiments, a capped SOF may serve as the base layer in which the functional groups present that were not suitable or complementary to participate in the specific chemical reaction to link together segments during the base layer SOF forming process may be available for reacting with the molecular building blocks of the second layer to form a chemically bonded multilayer SOF. If desired, the formulation used to form the second SOF layer should comprise molecular building blocks with functional groups capable of reacting with the functional groups from the base layer as well as additional functional groups that will allow for a third layer to be chemically attached to the second layer. The chemically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be chemically stacked.

In embodiments, the method for preparing chemically attached multilayer SOFs comprises promoting chemical attachment of a second SOF onto an existing SOF (base layer) by using a small excess of one molecular building block (when more than one molecular building block is present) during the process used to form the SOF (base layer) whereby the functional groups present on this molecular building block will be present on the base layer surface. The surface of base layer may be treated with an agent to enhance the reactivity of the functional groups or to create an increased number of functional groups.

In an embodiment the dangling functional groups or chemical moieties present on the surface of an SOF or capped SOF may be altered to increase the propensity for covalent attachment (or, alternatively, to disfavor covalent attachment) of particular classes of molecules or individual molecules, such as SOFs, to a base layer or any additional substrate or SOF layer. For example, the surface of a base layer, such as an SOF layer, which may contain reactive dangling functional groups, may be rendered pacified through surface treatment with a capping chemical group. For example, a SOF layer having dangling hydroxyl alcohol groups may be pacified by treatment with trimethylsiylchloride thereby capping hydroxyl groups as stable trimethylsilylethers. Alternatively, the surface of base layer may be treated with a non-chemically bonding agent, such as a wax, to block reaction with dangling functional groups from subsequent layers.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

In embodiments, a Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Practice of Linking Chemistry

In embodiments linking chemistry may occur wherein the reaction between functional groups produces a volatile byproduct that may be largely evaporated or expunged from the SOF during or after the film forming process or wherein no byproduct is formed. Linking chemistry may be selected to achieve a SOF for applications where the presence of linking chemistry byproducts is not desired. Linking chemistry reactions may include, for example, condensation, addition/elimination, and addition reactions, such as, for example, those that produce esters, imines, ethers, carbonates, urethanes, amides, acetals, and silyl ethers.

In embodiments the linking chemistry via a reaction between function groups producing a non-volatile byproduct that largely remains incorporated within the SOF after the film forming process. Linking chemistry in embodiments may be selected to achieve a SOF for applications where the presence of linking chemistry byproducts does not impact the properties or for applications where the presence of linking chemistry byproducts may alter the properties of a SOF (such as, for example, the electroactive, hydrophobic or hydrophilic nature of the SOF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an important aspect of the present disclosure. Reasons for controlling the rate and extent of reaction may include adapting the film forming process for different coating methods and tuning the microscopic arrangement of building blocks to achieve a periodic SOF, as defined in earlier embodiments. In certain examples of forming a structured organic film as described herein, the ingredients or constituents involved in the linking chemistry can be dissolved in a bio-based solvent by simple mixing of the ingredients and allowing for the molecular building blocks, linkers, capping segments, additives, and the like to be dissolved by the solvent to form a coating solution or dispersion. In certain examples, heat, agitation, stirring, shaking, or other thermal or mechanical means may be applied to the materials to facilitate or accelerate dissolving of the ingredients to make or form a precursor solution that later form the structured organic film (SOF) upon coating the precursor solution or completed solution or coating formulation onto a substrate by spray coating, slot die coating, flow coating, spin coating, or by other coating methods known to one skilled in the art.

Innate Properties of COFs

COFs have innate properties such as high thermal stability (typically higher than 400° C. under atmospheric conditions); poor solubility in organic solvents (chemical stability), and porosity (capable of reversible guest uptake). In embodiments, SOFs may also possess these innate properties.

Added Functionality of SOFs

Added functionality denotes a property that is not inherent to conventional COFs or SOFs and may occur by the selection of molecular building blocks wherein the molecular compositions provide the added functionality in the resultant SOF. Added functionality may arise upon assembly of molecular building blocks and/or capping segments having an "inclined property" for that added functionality. Added functionality may also arise upon assembly of molecular building blocks having no "inclined property" for that added functionality but the resulting SOF has the added functionality as a consequence of linking segments (S) and linkers into a SOF. In embodiments, added functionality may also arise upon the addition and assembly of molecular building blocks and capping segments having no "inclined property" for that added functionality but the resulting SOF has the added functionality as a consequence of linking segments, linkers, and capping segments into a SOF. Furthermore, emergence of added functionality may arise from the combined effect of using molecular building blocks bearing an "inclined property" for that added functionality whose inclined property is modified or enhanced upon linking together the segments and linkers into a SOF.

An Inclined Property of a Molecular Building Block

The term "inclined property" of a molecular building block refers, for example, to a property known to exist for certain molecular compositions or a property that is reasonably identifiable by a person skilled in art upon inspection of the molecular composition of a segment. As used herein, the terms "inclined property" and "added functionality" refer to the same general property (e.g., hydrophobic, electroactive, etc.) but "inclined property" is used in the context of the molecular building block and "added functionality" is used in the context of the SOF.

The hydrophobic (superhydrophobic), hydrophilic, lipophobic (superlipophobic), lipophilic, photochromic and/or electroactive (conductor, semiconductor, charge transport material) nature of an SOF are some examples of the properties that may represent an "added functionality" of an SOP. These and other added functionalities may arise from the inclined properties of the molecular building blocks or may arise from building blocks that do not have the respective added functionality that is observed in the SOF.

The term hydrophobic (superhydrophobic) refers, for example, to the property of repelling water, or other polar species such as methanol, it also means an inability to absorb water and/or to swell as a result. Furthermore, hydrophobic implies an inability to form strong hydrogen bonds to water or other hydrogen bonding species. Hydrophobic materials are typically characterized by having water contact angles greater than 90° and superhydrophobic materials have water contact angles greater than 150° as measured using a contact angle goniometer or related device.

The term hydrophilic refers, for example, to the property of attracting, adsorbing, or absorbing water or other polar species, or a surface that is easily wetted by such species. Hydrophilic materials are typically characterized by having less than 20° water contact angle as measured using a contact angle goniometer or related device. Hydrophilicity may also be characterized by swelling of a material by water or other polar species, or a material that can diffuse or transport water, or other polar species, through itself. Hydrophilicity, is further characterized by being able to form strong or numerous hydrogen bonds to water or other hydrogen bonding species.

The term lipophobic (oleophobic) refers, for example, to the property of repelling oil or other non-polar species such as alkanes, fats, and waxes. Lipophobic materials are typically characterized by having oil contact angles greater than 90° as measured using a contact angle goniometer or related device.

The term lipophilic (oleophilic) refers, for example, to the property attracting oil or other non-polar species such as alkanes, fats, and waxes or a surface that is easily wetted by such species. Lipophilic materials are typically characterized by having a low to nil oil contact angle as measured using, for example, a contact angle goniometer. Lipophilicity can also be characterized by swelling of a material by hexane or other non-polar liquids.

The term photochromic refers, for example, to the ability to demonstrate reversible color changes when exposed to electromagnetic radiation. SOF compositions containing photochromic molecules may be prepared and demonstrate reversible color changes when exposed to electromagnetic radiation. These SOFs may have the added functionality of photochromism. The robustness of photochromic SOFs may enable their use in many applications, such as photochromic SOFs for erasable paper, and light responsive films for window tinting/shading and eyewear. SOF compositions may contain any suitable photochromic molecule, such as a difunctional photochromic molecules as SOF molecular building blocks (chemically bound into SOF structure), a monofunctional photochromic molecules as SOF capping segments (chemically bound into SOF structure, or unfunctionalized photochromic molecules in an SOF composite (not chemically bound into SOF structure). Photochromic SOFs may change color upon exposure to selected wavelengths of light and the color change may be reversible.

SOF compositions containing photochromic molecules that chemically bond to the SOF structure are exceptionally chemically and mechanically robust photochromic materials. Such photochromic SOF materials demonstrate many superior properties, such as high number of reversible color change processes, to available polymeric alternatives.

SOFs having a rough, textured, or porous surface on the sub-micron to micron scale may be hydrophobic. The rough, textured, or porous SOF surface can result from dangling functional groups present on the film surface or from the structure of the SOF. The type of pattern and degree of patterning depends on the geometry of the molecular building blocks and the linking chemistry efficiency. The feature size that leads to surface roughness or texture is from about 100 nm to about 10 µm, such as from about 500 nm to about 5 µm.

Process for Preparing an Ionic Structured Organic Film (SOF)

The process for making ionic SOFs (which may be referred to as an "SOF" below) typically comprises a similar number of activities or steps (set forth below) that are used to make a non-ionic SOF. The ionic segment may be added during either step a, b or c depending the desired distribution of the ionic segment in the resulting SOF. For example, if it is desired that the ionic segment distribution is substantially uniform over the resulting SOF, the ionic segment may be added during step a. Alternatively, if, for example, a more heterogeneous distribution of the ionic segment is desired, adding the ionic segment (such as by spraying it on the film formed during step b or during the promotion step of step c) may occur during steps b and c. Alternatively, the ionic segment may be innately ionic, or can be subjected to an additional post-processing step, e.g., after step c) to add or react with a capping segment or molecular building block to provide an ionic group.

The process for making SOFs typically comprises a number of activities or steps (set forth below) that may be performed in any suitable sequence or where two or more activities are performed simultaneously or in close proximity in time:

A process for preparing a structured organic film comprising:

(a) preparing a liquid-containing reaction mixture comprising a plurality of molecular building blocks each comprising a segment and a number of functional groups. Optionally, one or more pre-linkers, catalysts, additives, or building blocks corresponding to building block segments, capping segments, ionic capping segments, ionic building block segments, or combinations thereof may be incorporated into the reaction mixture by dissolution or dispersion;

(b) depositing the reaction mixture as a wet film;

(c) promoting a change of the wet film including the molecular building blocks to a dry film comprising the SOF comprising a plurality of the segments and a plurality of linkers arranged as a covalent organic framework, wherein at a macroscopic level the covalent organic framework is a film;

(d) optionally removing the SOF from the coating substrate to obtain a free-standing SOF;

(e) optionally processing the free-standing SOF into a roll;

(f) optionally cutting and seaming the SOF into a belt; and (g) optionally performing the above SOF formation process(es) upon an SOF (which was prepared by the above SOF formation process(es)) as a substrate for subsequent SOF formation process(es).

The above activities or steps may be conducted at atmospheric, super atmospheric, or subatmospheric pressure. The term "atmospheric pressure" as used herein refers to a pressure of about 760 torr. The term super atmospheric, refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed. Further considerations related to the aforementioned process steps or processes for preparing or fabricating SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

Examples of the present disclosure include various CEM and AEM-type SOFs which have been made to evaluate the ion exchange capacity (IEC) of these materials. The IEC is a parameter that provides the number of cationic groups for AEMs or the number of anionic groups for CEMs based on number of equivalents (frequently milliequivalents) per gram of dry membrane. IEC is an ion-exchange capacity, also referred to as a charge per mass of polymer expressed either in milliequivalents of charge per gram of polymer, meq/g. In certain examples, a doubly charged ion within the polymer has twice the equivalents of charge as compared to a singly charged ion.

As described herein, a variety of ionic molecules, or ionic molecule precursors, that can be used as molecular building blocks or capping groups can be combined with one of the two aromatic building block molecules (THM-TBD or TME-TBD) as described previously. The reaction mechanisms employed in the examples are based on the formation of ether linkages (transetherification) but the reaction linkages can be extended to B—O (boroxine, boronate ester, spiroborate, and borosilicate), C=N (imine, hydrazone, and squaraine), C—N (β-ketoenamine, imide, and amide), in other examples. Examples of the present disclosure include ionic capping segments added to SOFs based on molar equivalents. A molar equivalent is a ratio of moles of a capping segment, for example, 3-methanol-6-Azoniaspiro [5.5]undecane bromide, 1,1-dimethyl-4-hydroxymethyl-piperidinium bromide, 1-methyl-1-ethyl-4-methanol-piperidinium bromide, (1,1-dialkyl-4-hydroxymethyl-piperidinium bromide), 1,2,4,5-tetramethyl-3-hydroxymethyl-imidazolium bromide, 1,2,4,5-tetramethyl-3-hydroxyethyl-imidazolium bromide, 4-(Hydroxymethyl)-1-methylpyridinium bromide, 4-(Hydroxyethyl)-1-methylpyridinium bromide, 1-methyl-1-hydroxymethyl-pyrrolidinium bromide, 1-methyl-1-hydroxyethyl-pyrrolidinium bromide, to moles of a molecular building block, such as THM-TBD. In certain examples, including, but not limited to the ones recited herein, the capping segment or other ionic component may alternatively be present in an SOF formulation without a counterion, for example, bromide. The SOF film provided may not include the counterion as formed, and therefore may have an ionic character imparted after fabrication via reaction or other means. This ratio or concentration of capping segments to segments can be from about 0.5, to about 10.0, or from about 1.0 to about 5.0, or from about 1.0 to about 2.5, based on a total concentration of segments in the SOF. This ratio or concentration of capping segments to segments can be from about 0.5, to about 10.0, or from about 1.0 to about 5.0, or from about 1.0 to about 2.5. Molar equivalents of ionic capping segments as compared to non-ionic segments, or nonionic segments, can also be from about 0.5, to about 10.0, or from about 1.0 to about 5.0, or from about 1.0 to about 2.5. The upper limit of ionic capping group segments depends on the number of reactive functional group sites on a given molecular building block segment. It cannot exceed n−2, where n is the number of reactive functional groups on a molecular building block segment, otherwise a linear polymer or small molecules can form.

Bio-Based Solvents and Examples

A bio-based material is a material purposefully fabricated from substances derived from living, or once-living starting materials. These starting materials and their bio-based products can include materials derived from renewable biological resources, and typically include a lower environmental or toxicological impact. A bio-based solvent may alternatively be referred to as a bio-renewable solvent or a bio-solvent.

Dihydrolevoglucosenone, or Cyrene™, is considered a green or less toxic alternative to dimethyl sulfoxide (DMSO), which is another highly used solvent in current SOF formulations. It is known in the art that the toxicity of DMSO is present at concentrations as low as 10% and rapid decomposition of DMSO when heated, can generate excessive heat, along with gases such as $CO_2$, methane and hydrogen. Cyrene™ is similar to N-methyl-2-pyrrolidone (NMP) in its inherent solvent properties, as shown in Table 1, however since Cyrene™ does not contain nitrogen or sulfur heteroatoms there is no likelihood of NOx and SOx emissions upon incineration, reducing end-of-life environmental concerns significantly.

Table 1 shows Hansen solubility parameters of a variety of solvents for use in SOF formulations. Hansen solubility parameters are a measure of solvency power. The solvents shown are fairly close in the Hansen space and are very likely to exhibit similar solubilizing properties.

TABLE 1

Physical properties of Cyrene and other dipolar aprotic solvents used in SOF formulation

| Property | Cyrene™ | DMF | DMSO | NMP | DMAc |
|---|---|---|---|---|---|
| $\delta D/MPa^{0.5}$ - dispersion (dD) | 18.8 | 17.4 | 18.4 | 18.4 | 16.8 |
| $\delta P/MPa^{0.5}$ - polar (dP) | 10.6 | 13.7 | 16.4 | 12.3 | 11.5 |
| $\delta H/MPa^{0.5}$ - hydrogen bonding (dH) | 6.9 | 11.3 | 10.2 | 7.2 | 10.2 |
| Surface tension/mN m$^{-1}$ | 33.6 | 37.1 | 42.9 | 40.1 | 36.7 |
| Dipolarity ($\pi^*$) | 0.93 | 0.88 | 1.00 | 0.90 | 0.85 |
| Relative molecular mass | 128.11 | 73.09 | 78.13 | 99.13 | 87.12 |
| Boiling point (° C.) | 203 | 153 | 189 | 202 | 164-166 |
| Vapor pressure (kPa) at 25° C. | 0.028 | 0.37 | 0.08 | 0.050 | 0.33 |
| Flash point (° C.) | 108 | 58 | 95 | 86-91 | 70 |
| Autoignition point (° C.) | 296 | 445 | 300-302 | 270 | 490 |
| Freezing point (° C.) | <−20 | −60.4 | 18.55 | −24.4 | −20 |
| Density (g · cm$^3$) | 1.25 | 0.94 | 1.10 | 1.03 | 0.94 |
| Viscosity (mPa · s) at 20° C. | 14.5 | 0.8-0.9 | 2.0 | 1.9 | 0.92-1.02 |

The SOF membranes or functional thin layers made from SOF pre-cure solutions are typically coated via a slot die coater onto nonwoven polymeric or polymeric mesh substrates. The pre-cure usually has low viscosity due to 10-30 wt. % solids, or in other examples, from about 10% to about 60% content in the formulation, resulting in viscosities of from about 1 MPa-s (cP) to about 50 MPa-s (cP), or from about MPa-s (cP) to about 100 MPa-s (cP). In certain examples, the viscosity ranges from about 5 MPa-s (cP) to about 35 MPa-s (cP), or from about 9 MPa-s (cP) to about 20 MPa-s (cP).

The mobility of the pre-cure within the slot die head used for coating procedures is much higher at low viscosities since it is not a typical polymeric solution. This high mobility can cause larger air entrainment velocity which can increase the stresses in the final coating from bubbles or voids trapped within the film. Additional coating issues with the use of current solvents can include meniscus thickening or deposition at the slot die head from the recrystallized or precipitated of pre-cure components when formulated in some of these lower boiling and higher vapor pressure solvents. Thin film formation can be difficult when using these low viscosity solutions because above a certain coating speed, the downstream meniscus cannot bridge the distance between die lip and film anymore resulting in break-up of the meniscus resulting in film defects. Low viscosity solutions can also be prone to edge thickening due to surface tension effects. The solution will evaporate faster at the edges when coated onto a substrate due to the surface tension and thicker dry film edges occur on the coated substrate. Higher viscosity solutions do not suffer from surface tension effects such as these, as they instead rely on shear thinning, thixotropic recovery and yield stresses at these interfaces. Cyrene™ has both a high boiling point and low vapor pressure as well as a high viscosity which is beneficial for both uniform and homogeneous films, in contrast to the effects of low solvents described previously. Low temperature boiling solvents with high volatility can result in rapid recrystallization of the molecular building blocks before curing and are typically highly toxic and flammable.

The identification and use of a range of bio-based solvents that can be used as the solubilizing solvent for SOF pre-cure solutions addresses these issues associated with low temperature boiling solvents, as well as the environmental and toxicological issues. These bio-based solvents can also be mixed with conventional solvents if necessary to achieve more aligned or tailored Hansen solubility parameters, viscosity, surface tension, boiling point, and other properties. Table 2 illustrates some of the key bio-based solvents useful in these SOF formulations.

2-methyl-tetrahydrofuran, ethanol, 1,2-propane-diol. 1,3-propane-diol, 1,4-butane-diol, furfuryl alcohol, 2-butyl furan, difurylpropane, ethyl furfuryl ether, 2-bromo furan, 2-butyryl furan, 20-ethyl furan, 2-furaldehyde, 2-furfuryl alcohol, 2-methylfuran, tetrahydrofurfuryl alcohol, 2.5 dimethyl furan, and combinations thereof. Other examples of non-viscous bio-based solvents include 2-methyl-tetrahydrofuran, ethanol and cyclopentyl methyl ether (CPME), or combinations thereof. Other bio-based solvent compositions can include one or more of bio-propanol, bio-butanol, bio-methanol, bio-ethanol, bio-based polypropylene glycols, bio-based ethylene glycols, bio-glycol ethers, bio-based butanediol, bio-based propanediol, bio-lactate esters, bio-acetate esters, D-limonene, methyl soyate, and isohexane, or combinations thereof. Illustrative examples of bio-based solvents may have boiling points wherein the bio-based solvent has a boiling point above 165° C. or where the viscosity of the solvent ranges from about 0.5 MPa-s (cP) to about 55 MPa-s (cP).

EXAMPLES

General Process:

TABLE 2

Properties of bio-based solvents as petroleum-based solvent replacements for SOF formulations

| Solvent Name | Molecular Weight | Boiling point (° C.) | Density (g/cm3) | Viscosity (mPA · s) | Vapour pressure (kPa) at 25° C.) | Flash point |
|---|---|---|---|---|---|---|
| Cyrene ™ | 128.11 | 203 | 1.25 | 14.5 | 0.028 | 108 |
| Tamisolve ® NxG | 141.21 | 241 | 0.960 | 4.3 | 0.013 | 108 |
| Ethyl lactate | 118.13 | 151-155 | 1.03 | 2.71 | 0.36 | 46 |
| Rhodiasolv ® PolarClean (methyl-5-(dimethylamino)-2-methyl-5-oxopentanoate) | 187.8 | 278-282 | 1.015-1.043 | 7.41-8.95 | 1.00 | 144-146 |
| dimethyl isosorbide (DMI) | 174.19 | 235-237 | 1.15 | 6.8 | 0.0097 | 108 |
| γ-Valerolactone (GVL) | 100.12 | 207-208 | 1.055 | 2.18 | 0.067 | 96 |
| Glycofurol | 146.19 | 80-100*; 176 | 1.08 | 8-18 | 0.0050 | 135 |
| Triacetin (glycerol derivative, glycerol triacetate) | 218.20 | 259 | 1.158 | 23 | <0.01 | 138 |
| Diethylene glycol monoethyl ether acetate (DCAC) | 176.22 | 218-219 | 1.012 | 2.8 | 0.010 | 95-107 |
| Acetyltributylcitrate (ATBC) | 402.48 | 172-174 | 1.05 | 34 | 0.11 | 204 |
| Acetyltriethylcitrate (ATEC) | 318.32 | 228-229 | 1.136 | 54 | 0.000027 ≈ 0 | 113 |
| Triethyl citrate (TEC) | 276.29 | 294 | 1.135 | 35.2 | 0.00025 ≈ 0 | 155 |
| 2-Methyltetrahydrofuran (MeTHF) | 86.13 | 80.2 | 0.854 | 0.46** | 13.6 | −10 |
| Cyclopentyl methyl ether (CPME) | 100.16 | 106 | 0.863 | 0.57** | 5.95 | −1 |

Illustrative examples of more viscous bio-based solvents for SOF formulation compositions include dihydrolevoglucosenone (Cyrene™), 1-Butylpyrrolidin-2-one (Tamisolve® NxG), Ethyl lactate, Rhodiasolv® PolarClean (methyl-5-(dimethylamino)-2-methyl-5-oxopentanoate), dimethyl isosorbide (DMI), γ-Valerolactone (GVL), Glycofurol, Triacetin (glycerol derivative, glycerol triacetate), diethylene glycol monoethyl ether acetate (DCAC), acetyltributylcitrate (ATBC), acetyltriethylcitrate (ATEC), triethyl citrate (TEC) and combinations thereof. Illustrative examples of suitable low viscosity bio-based solvents for SOF formulation compositions include, for example, All components used in the formulation such as one or more catalysts, additives, THM-TBD building block and other building blocks for ionic charge, flexibility, changes in porosity, and other properties, were added in a 10 mL vial with DMSO, as further detailed in Table 3 or Cyrene™, as detailed in Table 4. The solution was placed in a sonicator for 10-20 minutes depending on rate of solubility of components. The vial was then placed in a block heater at 65-90° C. for 60 to 90 minutes or in some examples from about 30 minutes to about 120 minutes. After heating the solution, the initial cloudy solution became transparent with no sign of precipitation and stable at room temperature. The solution, usually a total weight of about 3 to about 4 g, was then poured into an aluminum pan and cured at 180-200° C. for 40 to 60 minutes, or in certain examples, from about 120 minutes to about 200 minutes. In some experiments the curing step was done in 15° C. increments starting from 90 to 100° C. The resulting SOF is usually a smooth yellow film that delaminates by itself from the aluminum pan. The SOF pre-cure for the examples using THF and DMF as shown in Table 3 were slot die coated at a flow rate of 10 μl/s with a coating speed of 3 mm/s and cured at 120° C. for 40 minutes. In certain examples, coating speeds from about 1 mm/s to about 3 mm/s, temperatures from about 120 minutes to about 200 minutes, or times from about 30 minutes to about 60 minutes. Illustrative additives for SOF formulations may include surfactants, leveling agents, adhesion promoters, including, but not limited to Silclean 3700 (in quantities from about 0.1 to about 5 wt %), Modaflow resin (in quantities from about 0.1 to about 5 wt %), Modaflow 2100 (in quantities from about 0.1 to about 5 wt %), or Additol XL 482 (in quantities from about 0.1 to about 5 wt %).

TABLE 3

Comparative example of SOF film made using DMSO, THF, and DMF solvent

| Building Block | Additive | Solvent | Catalyst | Solids wt. % | Results when Cured |
|---|---|---|---|---|---|
| THM-TBD | Leveling agent 1-wt. % | Dimethyl-sulfoxide | 0.25 wt. % | 10 | Partially cured opaque free film |
| THM-TBD | Leveling agent 1-wt. % | Tetrahydro-furan | 0.25 wt. % | 10 | Cured on nylon membrane filter |
| THM-TBD | Leveling agent 1-wt. % | Dimethyl-formamide | 0.25 wt. % | 10 | Cured on nylon membrane filter |

In the examples shown in Table 4, coating was conducted on 220 μm/56% open space polyetheretherketone (PEEK) mesh or screen. The coating technique used to apply the SOF solution to PEEK mesh involved using a slot die coater (made by Ossila) in which the SOF solution was delivered via a syringe pump onto the PEEK substrate via the narrow slot positioned close to the PEEK surface. The substrate was moved at a rate of 2 to 3 mm/s, while the SOF pre-cure solution was metered onto the substrate at a flow rate of 20 to 30 μL/s. The stage rate of 2 mm/s with a flow rate of about 25 μL/s provided few areas of solution pooling on the substrate. The final optical microscopy imaging observations exhibited no pinholes or cracks and were completely robust to overnight soaking in tetrahydrofuran (THF) solvent. Table 4 shows five prototype formulations that substitute DMSO, THF and DMF with Cyrene™, as compared to those listed in Table 3, as the dissolving solvent for the SOF pre-cure solution. All examples were fully cured based on results of a THF 24-hour soak test, where the free film was weighed before and after soaking. It should be noted that although Cyrene™ was used in all samples listed in Table 4, the other solvent noted in Table 2 show similar film properties and qualities based on the solvent properties noted therein. It should further be noted that in certain bio-based solvent formulations for SOFs, additional catalyst is not necessary for complete curing of the SOF formulations, particularly formulations that include Cyrene™. Without being bound to any particular theory, it is thought that some possible crosslinking reactions can occur between the chemical structure of the solvents and the chemical functionality of the constituent ingredients of the various SOF formulations as described herein. For example, the equilibrium between Cyrene™ and its hydrate in water may be acidic enough to catalyze the reaction in the SOF. Moisture from the environment or residual in hydrophilic starting materials may also participate in catalysis. Because of this reaction with water, Cyrene™ may be present in the final film. Residual Cyrene™ or other bio-based solvents can be present in trace amounts in and can react within SOF networks via ring opening or hydration from ketone to diol form during the curing process. Moreover, while bio-based solvents and conventional or synthetic solvents are chemically indistinguishable, it has been determined that isotopic composition of the carbon atoms within the chemical compositions of bio-based solvents can be distinguished from conventional or synthetic solvents with the use of radiocarbon dating methods.

The ion exchange capacity (IEC) of this coated screen was measured via titration methodology and expressed as the quantity of ions that can be taken up by a specific volume of the SOF film or SOF coated on PEEK substrate. The IEC was reported as 0.74 meq/g, which is excellent considering the minimal deposition of the imidazolium SOF on PEEK. Materials such as Sustainion (IEC, 2.52 meq/g; thickness, 50 μm) 5 and quaternary ammonium poly(N-methyl-piperidine-co-p-terphenyl)5 (QAPPT) w (IEC, 2.65 meq/g; thickness, 25 μm) base IEC on full free film with no substrate and very robust film thicknesses. In exemplary examples, the aluminum oxide membrane is characterized by a 0.2 micron pore size. Polyols used can include pentaerythritol, from Sigma Aldrich.

TABLE 4

Examples of SOF formulations utilizing Cyrene ™ as a bio-based, bio-renewable solvent.

| Building Block | Capping Segment | Pre-linker | Solvent | Catalyst wt % | Solids wt. % | Cured? | Comments |
|---|---|---|---|---|---|---|---|
| THM-TBD | None | | Cyrene ™ | 0 | 20 | Yes | Cured stepwise to ~200° C. Film did not crack apart |
| | | | | 1 | 20 | 1. Yes 2. Yes | Cured stepwise to ~200° C. 1. Free-film that cracked 2. Aluminum oxide membrane |
| THM-TBD | | Pentaeyrthritol for flexibility (18% and 31 wt. % tested) | Cyrene ™ | 0 | 25 | Yes | Cured stepwise to ~200° C. Film self-curled into kernels upon curing (18% polyol) |
| | | | | 0 | 20 | Yes | Cured stepwise to ~200° C. Film did not curl or kernel this time and was flexible (31% polyol) |

TABLE 4-continued

Examples of SOF formulations utilizing Cyrene™ as a bio-based, bio-renewable solvent.

| Building Block | Capping Segment | Pre-linker | Solvent | Catalyst wt % | Solids wt. % | Cured? | Comments |
|---|---|---|---|---|---|---|---|
| THM-TBD | Imidazolium capping group for cationic charge (28.75 wt. % tested) | | Cyrene™ | 1 wt. % | 20 | Yes | Coated on 220 µm, 56% open area PEEK screen |

Examples of the present disclosure provide a process or method including contacting at least one SOF building block with at least one bio-based solvent to form a pre-cure solution, stirring the solution with additives and catalyst, heating to dissolve components and optionally coat onto a substrate or free-film coating in a pan, followed by thermal curing. Slot die coating may be one method of coating employed. In certain examples, catalyst is not needed for the SOF formulation and curing occurs regardless of catalyst addition. This contrasts most known SOF formulations. In examples where catalyst is used, the catalyst may be present in an SOF formulation or composition from 0% to about 3% by weight of the SOF composition. In examples of the present disclosure, a process is provided where the SOF pre-cure solution can be heated from about 60° C. to about 90° C., before or after adding a catalyst, if catalyst is used. It should be noted that while heating and agitation steps can facilitate dissolving of the components of the SOF formulations of the present disclosure, these steps are not necessary in all examples.

In examples, a process is provided where the SOF is cured as a free standing film from about 100° C. to about 200° C. for 1 hour or alternatively placed in an oven from about 120° C. to about 180° C. for about 30 to about 90 minutes. Processes of the present disclosure include the use of viscous bio-based solvents including Cyrene™, Tamisolve® NxG, Ethyl lactate, Rhodiasolv® PolarClean (methyl-5-(dimethylamino)-2-methyl-5-oxopentanoate), dimethyl isosorbide (DMI), γ-Valerolactone (GVL), Glycofurol, Triacetin (glycerol derivative, glycerol triacetate), diethylene glycol monoethyl ether acetate (DCAC), acetyltributylcitrate (ATBC), acetyltriethylcitrate (ATEC), triethyl citrate (TEC) and combinations thereof. Illustrative examples of suitable low viscosity bio-based solvents for use in SOF formulations or compositions include, for example, 2-methyl-tetrahydrofuran, ethanol, 1,2-propane-diol. 1,3-propane-diol, 1,4-butane-diol, furfuryl alcohol, 2-butyl furan, difurylpropane, ethyl furfuryl ether, 2-bromo furan, 2-butyryl furan, 20-ethyl furan, 2-furaldehyde, 2-furfuryl alcohol, 2-methylfuran, tetrahydrofurfuryl alcohol, 2.5 dimethyl furan, or combinations thereof. Alternative non-viscous solvents include 2-methyl-tetrahydrofuran, ethanol and cyclopentyl methyl ether (CPME). Other bio-based solvents used herein can include one or more of bio-propanol, bio-butanol, bio-methanol, bio-ethanol, bio-based polypropylene glycols, bio-based ethylene glycols, bio-glycol ethers, bio-based butanediol, bio-based propanediol, bio-lactate esters, bio-acetate esters, D-limonene, methyl soyate, and isohexane, or combinations thereof.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of forming a pre-cure solution for a structured organic film (SOF), comprising:
    contacting at least one segment and at least one pre-linker comprising a polyol, a diamine, a polyamine, or a combination thereof, with a bio-based solvent; and
    dissolving the at least one segment and the at least one pre-linker within the bio-based solvent; and wherein the bio-based solvent comprises 1-butylpyrrolidin-2-one, methyl-5-(dimethylamino)-2-methyl-5-oxopentanoate, dimethyl isosorbide, glycofurol, triacetin, diethylene glycol monoethyl ether acetate, acetyltributylcitrate, acetyltriethylcitrate, triethyl citrate, or combinations thereof.

2. The method of forming a pre-cure solution for a structured organic film (SOF) of claim 1, further comprising heating the at least one segment and the at least one pre-linker and the bio-based solvent, wherein heating the at least one segment and the at least one pre-linker and the bio-based solvent is performed before or after dissolving the at least one segment and the at least one pre-linker within the bio-based solvent.

3. The method of forming a pre-cure solution for a structured organic film (SOF) of claim 1, further comprising contacting a plurality of capping segments with the at least one segment and the at least one pre-linker and the bio-based solvent while forming the pre-cure solution.

4. The method of forming a pre-cure solution for a structured organic film (SOF) of claim 3, wherein at least one segment and/or at least one or more of the plurality of capping segments comprises at least one ionic species.

5. The method of forming a pre-cure solution for a structured organic film (SOF) of claim 1, further comprising contacting one or more additives with the pre-cure solution.

6. The method of forming a pre-cure solution for a structured organic film (SOF) of claim 5, wherein the one or more additives comprise a surfactant, a leveling agent, an adhesion promoter, or a combination thereof.

7. The method of forming a pre-cure solution for a structured organic film (SOF) of claim 1, further comprising contacting one or more catalysts with the pre-cure solution.

8. The method of forming a pre-cure solution for a structured organic film (SOF) of claim 7, wherein catalyst is added in an amount from about 0.1 wt % to about 3 wt % based on a total weight of the pre-cure solution.

9. The method of forming a pre-cure solution for a structured organic film (SOF) of claim 1, wherein a portion of at least one segment comprise an ionic capping segment.

10. The method of forming a pre-cure solution for a structured organic film (SOF) of claim 1, further comprising allowing the bio-based solvent to evaporate to form the structured organic film (SOF) prior to heating the pre-cure solution.

11. The method of forming a pre-cure solution for a structured organic film (SOF) of claim 1, wherein the pre-cure solution is heated from about 60° C. to about 90° C.

12. The method of forming a pre-cure solution for a structured organic film (SOF) of claim 1, wherein the structured organic film (SOF) is cured from about 100° C. to about 200° C. for about 1 hour.

13. The method of forming a pre-cure solution for a structured organic film (SOF) of claim 1, wherein no catalyst is added to the pre-cure solution or the structured organic film (SOF).

14. The method of forming a pre-cure solution for a structured organic film (SOF) of claim 1, wherein the bio-based solvent further comprises dihydrolevoglucosenone, ethyl lactate, γ-Valerolactone, or combinations thereof.

15. A method of forming a pre-cure solution for a structured organic film (SOF), comprising:
  contacting at least one segment and at least one pre-linker comprising a polyol, a diamine, a polyamine, or a combination thereof, with a bio-based solvent;
  heating the at least one segment and the at least one pre-linker with the bio-based solvent; and
  dissolving the at least one segment and the at least one pre-linker within the bio-based solvent;
  forming a structured organic film (SOF) on a substrate from the pre-cure solution; and
  curing the structured organic film (SOF), wherein:
    the bio-based solvent comprises 1-butylpyrrolidin-2-one, methyl-5-(dimethylamino)-2-methyl-5-oxopentanoate, dimethyl isosorbide, glycofurol, triacetin, diethylene glycol monoethyl ether acetate, acetyltributylcitrate, acetyltriethylcitrate, triethyl citrate, or combinations thereof; and
    heating the at least one segment and the at least one pre-linker and the bio-based solvent is performed before or after dissolving the at least one segment and the at least one pre-linker within the bio-based solvent.

16. The method of forming a pre-cure solution for a structured organic film (SOF) of claim 15, wherein the bio-based solvent further comprises dihydrolevoglucosenone, ethyl lactate, γ-Valerolactone, or combinations thereof.

17. The method of forming a pre-cure solution for a structured organic film (SOF) of claim 15, wherein the structured organic film (SOF) comprises a membrane.

18. The method of forming a pre-cure solution for a structured organic film (SOF) of claim 15, wherein the structured organic film (SOF) is free-standing and thus not adhered to the substrate or a supporting structure after curing.

19. The method of forming a pre-cure solution for a structured organic film (SOF) of claim 18, wherein the substrate comprises polyetheretherketone (PEEK).

20. A composition, comprising:
  a bio-based solvent;
  at least one structured organic film (SOF) segment; and
  at least one structured organic film (SOF) pre-linker comprising a polyol, a diamine, a polyamine, or a combination thereof; and
  wherein the bio-based solvent comprises 1-butylpyrrolidin-2-one, methyl-5-(dimethylamino)-2-methyl-5-oxopentanoate, dimethyl isosorbide, glycofurol, triacetin, diethylene glycol monoethyl ether acetate, acetyltributylcitrate, acetyltriethylcitrate, triethyl citrate, or combinations thereof.

* * * * *